US012690728B2

(12) United States Patent
Kolokithas

(10) Patent No.: US 12,690,728 B2
(45) Date of Patent: Jul. 28, 2026

(54) DRYING DEVICE TO FACILITATE GLOVE PLACEMENT

(71) Applicant: Steven G. Kolokithas, Cave Springs, AR (US)

(72) Inventor: Steven G. Kolokithas, Cave Springs, AR (US)

(73) Assignee: Steven Kolokithas, Cave Springs, AR (US)

( * ) Notice: Subject to any disclaimer, the term of this patent is extended or adjusted under 35 U.S.C. 154(b) by 1241 days.

(21) Appl. No.: 17/011,659

(22) Filed: Sep. 3, 2020

(65) Prior Publication Data

US 2021/0059486 A1     Mar. 4, 2021

Related U.S. Application Data

(60) Provisional application No. 62/957,100, filed on Jan. 3, 2020, provisional application No. 62/895,312, filed on Sep. 3, 2019.

(51) Int. Cl.
*A47K 10/48*          (2006.01)
*A61C 17/022*        (2006.01)

(52) U.S. Cl.
CPC ............ *A47K 10/48* (2013.01); *A61C 17/022* (2013.01)

(58) Field of Classification Search
CPC ...... A47K 10/48; A61C 17/022; A61C 17/00; A61G 15/14; A61G 15/16; A61G 15/18
See application file for complete search history.

(56) References Cited

U.S. PATENT DOCUMENTS

| | | | | | |
|---|---|---|---|---|---|
| 1,506,041 | A | * | 8/1924 | Bassette | A47K 10/48 |
| | | | | | 34/201 |
| 2,063,896 | A | * | 12/1936 | Martin | A45D 20/22 |
| | | | | | 34/100 |
| 3,229,368 | A | * | 1/1966 | Tocchini | A61G 15/14 |
| | | | | | D24/177 |
| 3,346,957 | A | * | 10/1967 | Maurer | A61C 1/0007 |
| | | | | | 433/79 |
| 3,553,840 | A | * | 1/1971 | Bordelon | A61G 15/14 |
| | | | | | 433/91 |
| 3,986,281 | A | * | 10/1976 | Darwin | D06F 71/06 |
| | | | | | 38/17 |

(Continued)

FOREIGN PATENT DOCUMENTS

JP          2001037675 A   *  2/2001

*Primary Examiner* — Michael G Hoang
*Assistant Examiner* — Bao D Nguyen
(74) *Attorney, Agent, or Firm* — Sheppard Mullin Richter & Hampton LLP

(57)          ABSTRACT

A drying device includes a head unit, an air delivery system, and an air tube that couples the head unit to the air delivery system. The head unit includes an outlet port adapted to eject air into an environment, an activation switch configured to initiate ejection of the air, a supply port adapted to receive airflow, and a mounting bracket. The activation switch can be a mechanical switch or an electrical switch. The air delivery system includes an air valve coupled to an air tank and adapted to provide the airflow from the air tank to the supply port of the head unit responsive to activation and a timer device configured to activate the air valve for a period of time. The air tube couples the air valve of the air delivery system to the supply port of the head unit.

17 Claims, 11 Drawing Sheets

(56)     References Cited

U.S. PATENT DOCUMENTS

| | | | | |
|---|---|---|---|---|
| 4,026,025 | A * | 5/1977 | Hunt .................. | A61C 17/0217 |
| | | | | 433/80 |
| 4,973,247 | A * | 11/1990 | Varnes .................... | A61C 1/05 |
| | | | | 433/85 |
| 5,244,389 | A * | 9/1993 | Beach .................. | A61G 15/16 |
| | | | | 433/79 |
| 5,873,178 | A * | 2/1999 | Johnson ................ | A47K 10/48 |
| | | | | 34/91 |
| 2008/0096161 | A1* | 4/2008 | Cain ................. | A61C 17/0217 |
| | | | | 433/80 |
| 2009/0100620 | A1* | 4/2009 | Gatzemeyer ......... | A61C 1/0092 |
| | | | | 433/88 |
| 2015/0376881 | A1* | 12/2015 | Moe ...................... | A47K 10/48 |
| | | | | 4/638 |

* cited by examiner

Switch
202

Front Head
Portion
200A

Constrictor
222

Umbilical
206

Mounting
Bracket Portion
200B

Fasteners
226

Fasteners
224

O-ring
604

Slotted
Air
Passage
602

Piston
600

DRYING DEVICE TO FACILITATE GLOVE PLACEMENT

CROSS REFERENCE TO RELATED APPLICATIONS

The present application claims the benefit of U.S. Patent Application Ser. No. 62/895,312, filed Sep. 3, 2019, entitled "DRYING DEVICE TO FACILITATE GLOVE PLACEMENT FOR DENTAL OR MEDICAL PERSONNEL," and claims the benefit of U.S. Patent Application Ser. No. 62/957,100, filed Jan. 3, 2020, entitled "DRYING DEVICE TO FACILITATE GLOVE PLACEMENT FOR DENTAL OR MEDICAL PERSONNEL, LAB TECHNICIANS, FOOD HANDLERS, CONTRACTORS, MECHANICS, PAINTERS, AND ANYONE REQUIRED TO WEAR DISPOSABLE GLOVES," which are hereby incorporated by reference herein.

TECHNICAL FIELD

This disclosure pertains to a drying device, and more particularly to a drying device that facilitates glove placement.

BACKGROUND

It is a common challenge for people to put on rubber, disposable or plastic gloves when hands are hot or damp. Moisture on a person's hands (whether caused by sweat or contact with a wet substance) causes skin to become tacky, making it difficult to slide the gloves on, which may prevent full or proper placement of the gloves and which may cause gloves to break. This is especially problematic for professionals and support staff in the healthcare and food industries, where it is critical to replace groves often and to maintain hands and gloves sterile. The same challenge confronts anyone who regularly wears and replaces gloves, such as veterinarians, lab technicians, painters, hair stylists, and others.

SUMMARY

Disposable gloves (e.g., rubber gloves, latex gloves, nitrile gloves, plastic gloves, etc.) are difficult to put on when hands are hot or moist. Because the skin becomes tacky, the gloves stick to the skin, making it difficult to achieve a proper fit. At times, a person may attempt to pull on the gloves with extra force to overcome the tackiness, which may cause the gloves to break. In certain settings, such as in the medical field, and especially in dental offices, where professionals are required to regularly replace disposable gloves often, moisture on one's hands is a source of significant frustration.

Disclosed herein is a drying device that facilitates moisture removal to support easy and proper placement of gloves on the wearer's hands. In accordance with some embodiments of the invention, a drying device may be designed for a healthcare setting such as a dental or medical office, for a food court, or for any other setting where gloves are worn and often replaced.

In accordance with some embodiments of the invention, the drying device facilitates efficient and proper glove placement by providing a pressurized air from an outlet port of a head unit into an external environment to allow the user to cool and/or dry his or her hands before putting on disposable gloves. Initiation of airflow may be responsive to activation of a switch. A user can place his or her hands in the path of the airflow to remove excess moisture to thereby support gloves placement. The drying device may enable the user to remove moisture using a process that requires minimal to no physical contact with the drying device, thereby maintaining generally sterile hands and gloves. Accordingly, the drying device can enhance the ease of glove placement, can reduce the risk of glove tears, and can help to avoid a gloved or sterile hand from touching a non-sterile item or surface (thereby limiting the chance of disease transfer, which is particularly important in a healthcare setting).

The switch for initiating ejection of airflow can be a mechanical switch or an electrical switch. As previously noted, a user can activate the switch in a manner that keeps the risk of contamination of the user's hands low. In some embodiments, the switch may be activated using a back of a hand, using a foot pedal, or using a motion sensor that captures non-contact motion of the user (e.g., waiving one's hands in proximity of the motion sensor).

In some embodiments, the drying device may include a head unit and an air delivery system. In some embodiments, the switch may be on the head unit. In the case of an electrical switch, switch wires may be contained within an umbilical that couples the head unit and the air delivery system. The umbilical may also house an air hose that carries pressurized air from the air delivery system to an outlet port on the head unit. In some embodiments, an air supply system separate from the air delivery system may supply the pressurized air to the air delivery system, which may route the air to the head unit via the air hose contained in the umbilical. In some embodiments, the air supply system may be a component of the drying device. In some embodiments, the air supply system may be a stand-alone system.

In some embodiments, the head unit may include or be coupled to a mounting bracket configured to mount the head unit to another structure such as a tool rail of a dental delivery unit. A variety of coupling mechanisms are contemplated.

In some embodiments, the head unit may include a front head portion that attaches to a mounting portion that includes the mounting bracket. In some embodiments, the front head portion may be attached to the mounting portion using hooks, fasteners, screws, glue, clips, etc. In some embodiments, the front head portion may be attached to the mounting portion using two screws in the mounting portion that are adapted to be inserted into channels/openings in the front head portion, to allow the front head portion to removably hang on the mounting portion. In some embodiments, the front head portion and the mounting portion are integrally formed together.

In accordance with some embodiments of the invention, the drying device may include a diffuser coupled to the outlet port of the head unit to diffuse the air ejected therefrom and to reduce noise level of the airflow, e.g., so that the noise does not interfere with normal conversation.

In some example embodiments, the drying device includes a timer device such as a mechanical or digital timer that enables the airflow to cease after a time period has elapsed. In the case of a digital timer circuit, the timer may be programmable. In the case of a mechanical timer, mechanical structures (such as screws, stop limiters, orifice size, etc.) may be modified to adjust the time period of airflow.

In some embodiments, a drying device is disclosed that includes a head unit, an air delivery system, and an air tube that couples the head unit to the air delivery system. In some embodiments, the head unit includes an outlet port adapted to eject air into an environment; an activation switch configured to initiate ejection of the air; a supply port adapted to receive airflow; and a mounting bracket. In an example embodiment, the air delivery system includes an air valve coupled to an air tank and adapted to provide the airflow from the air tank to the supply port of the head unit responsive to activation; and a timer device configured to activate the air valve for a period of time.

In some embodiments, the air tube couples the air valve of the air delivery system to the supply port of the head unit. The activation switch may be a momentary contact switch. The activation switch may be a foot-activated switch. The activation switch may be a motion-activated switch. The mounting bracket may be adapted to mount to a tool bar of a dental delivery unit. The air valve may include an air solenoid valve. The timer device may include a programmable timer circuit. The air delivery system and the head unit may be contained in separate housings. The drying device may further include an air supply system that includes the air tank and an air compressor coupled to the air tank, the air compressor configured to pressurize the air for storage in the air tank. The drying device may further includes a constrictor coupled to the air tube, the constrictor adapted to adjust a pressure of the airflow to the supply port. The drying device may further include a diffuser coupled to the outlet port of the head unit, the diffuser adapted to diffuse the air into the environment. The air tank may be a standalone air tank located in a dental office. The air tank may be coupled to a stand-alone air compressor located in the dental office. The drying device may be portable. The air valve may be a mechanical air valve, the timer device including a spring mechanism for controlling the mechanical air valve. The activation switch may be adapted to activate the spring mechanism responsive to application of a mechanical force to the activation switch.

These and other features of the devices, systems, and methods disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
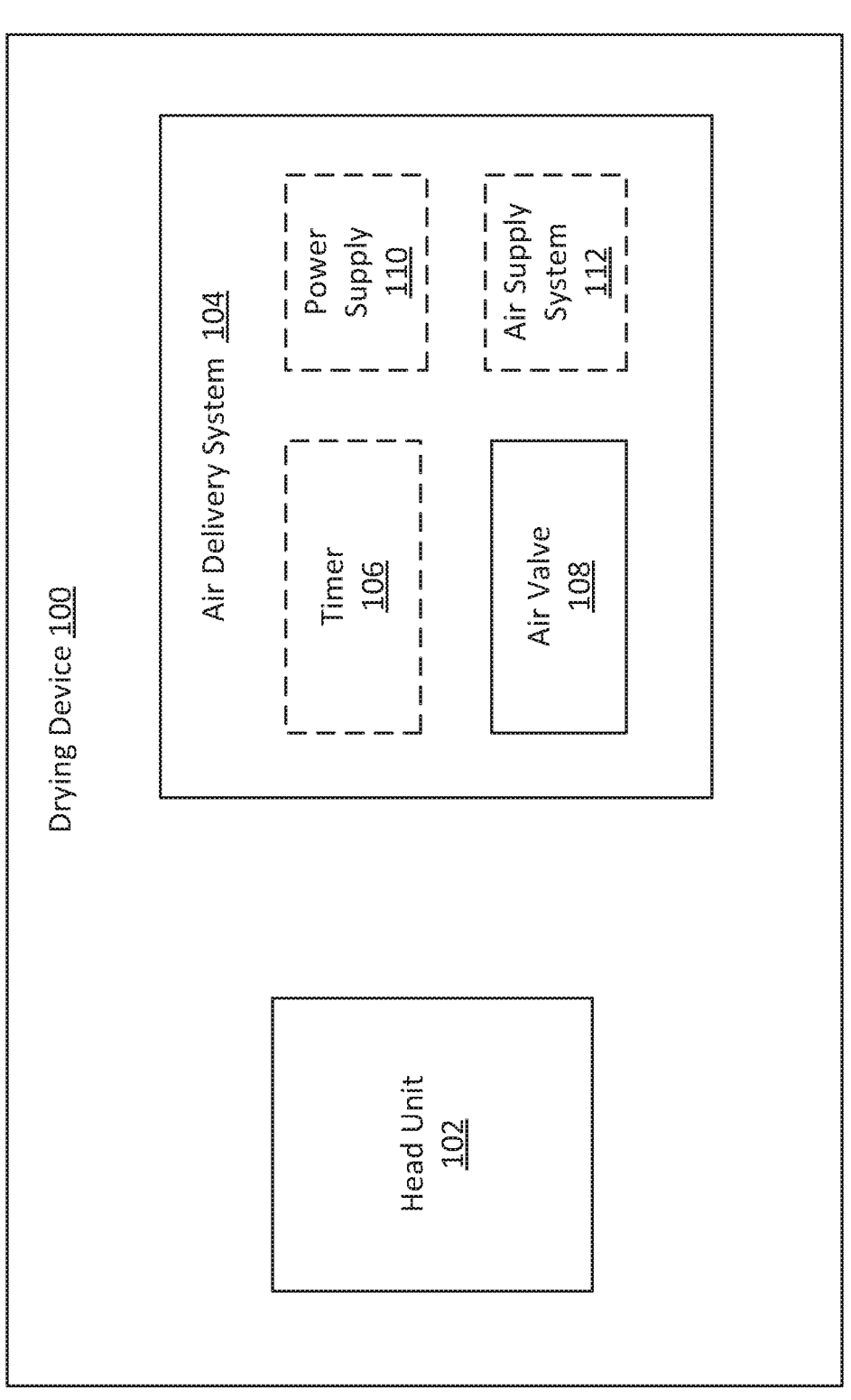
FIG. 1 is a block diagram illustrating components of a drying device, in accordance with some embodiments of the invention.

Disposable gloves (e.g., rubber gloves, latex gloves, nitrile gloves, plastic gloves, etc.) are difficult to put on when hands are hot or moist. Because the skin becomes tacky, the gloves stick to the skin, making it difficult to achieve a proper fit. At times, a person may attempt to pull on the gloves with extra force to overcome the tackiness, which may cause the gloves to break. In certain settings, such as in the medical field, and especially in dental offices, where professionals are required to regularly replace disposable gloves often, moisture on one's hands is a source of significant frustration.

Disclosed herein is a drying device that facilitates moisture removal to support easy and proper placement of gloves on the wearer's hands. In accordance with some embodiments of the invention, a drying device may be designed for a healthcare setting such as a dental or medical office, for a food court, or for any other setting where gloves are worn and often replaced.

In accordance with some embodiments of the invention, the drying device facilitates efficient and proper glove placement by providing a pressurized air from an outlet port of a head unit into an external environment to allow the user to cool and/or dry his or her hands before putting on disposable gloves. Initiation of airflow may be responsive to activation of a switch. A user can place his or her hands in the path of the airflow to remove excess moisture to thereby support gloves placement. The drying device may enable the user to remove moisture using a process that requires minimal to no physical contact with the drying device, thereby maintaining generally sterile hands and gloves. Accordingly, the drying device can enhance the ease of glove placement, can reduce the risk of glove tears, and can help to avoid a gloved or sterile hand from touching a non-sterile item or surface (thereby limiting the chance of disease transfer, which is particularly important in a healthcare setting).

The switch for initiating ejection of airflow can be a mechanical switch or an electrical switch. As previously noted, a user can activate the switch in a manner that keeps the risk of contamination of the user's hands low. In some embodiments, the switch may be activated using a back of a hand, using a foot pedal, or using a motion sensor that captures non-contact motion of the user (e.g., waiving one's hands in proximity of the motion sensor).

In some embodiments, the drying device may include a head unit and an air delivery system. In some embodiments, the switch may be on the head unit. In the case of an electrical switch, switch wires may be contained within an umbilical that couples the head unit and the air delivery system. The umbilical may also house an air hose that carries pressurized air from the air delivery system to an outlet port on the head unit. In some embodiments, an air supply system separate from the air delivery system may supply the pressurized air to the air delivery system, which may route the air to the head unit via the air hose contained in the umbilical. In some embodiments, the air supply system may be a component of the drying device. In some embodiments, the air supply system may be a stand-alone system.

In some embodiments, the head unit may include or be coupled to a mounting bracket configured to mount the head unit to another structure such as a tool rail of a dental delivery unit. A variety of coupling mechanisms are contemplated.

In some embodiments, the head unit may include a front head portion that attaches to a mounting portion that includes the mounting bracket. In some embodiments, the front head portion may be attached to the mounting portion using hooks, fasteners, screws, glue, clips, etc. In some embodiments, the front head portion may be attached to the mounting portion using two screws in the mounting portion that are adapted to be inserted into channels/openings in the front head portion, to allow the front head portion to removably hang on the mounting portion. In some embodiments, the front head portion and the mounting portion are integrally formed together.

In accordance with some embodiments of the invention, the drying device may include a diffuser coupled to the outlet port of the head unit to diffuse the air ejected therefrom and to reduce noise level of the airflow, e.g., so that the noise does not interfere with normal conversation.

In some example embodiments, the drying device includes a timer device such as a mechanical or digital timer that enables the airflow to cease after a time period has elapsed. In the case of a digital timer circuit, the timer may be programmable. In the case of a mechanical timer, mechanical structures (such as screws, stop limiters, orifice size, etc.) may be modified to adjust the time period of airflow.

These and other illustrative embodiments of the invention will now be described in reference to the accompanying figures. While the invention may be described using representative embodiments for illustrative purposes, it should be appreciated that the invention is not limited to the embodiments shown and described.

FIG. 1 is a block diagram illustrating components of a drying device 100, in accordance with some embodiments of the invention. The drying device 100 is adapted to eject pressurized air into an environment to enable a user to remove moisture from his or her hands, thereby making it easier for the user to put on gloves. As shown, the drying device 100 includes a head unit 102 and an air delivery system 104. In some embodiments, the head unit 102 is coupled via an umbilical to the air delivery system 104.

The head unit 102 may include a switch for initiating air to be supplied from the air delivery system 104 to the head unit 102. The head unit 102 may include an outlet port from which the air supplied to the head unit 102 is ejected into the environment. The switch may include an electrical switch, a mechanical switch, a motion-sensitive switch, and/or the like.

The air delivery system 104 may include a timer device 106, an air valve 108, a power supply 110 and an air supply system 112. The timer device 106 may be configured to permit the continuous flow of pressurized air from the air delivery system 104 to the head unit 102 for a predetermined period of time, at the expiration of which the airflow may cease. In some embodiments, the period of time for which the timer device 106 permits airflow from the air delivery system 104 to the head unit 102 may be configurable. In embodiments that use a mechanical switch, the timer device 106 may be part of the structure of the switch itself.

The air valve 108 may be adapted to supply air from the air delivery system 104 to the head unit 102. In some embodiments, the air valve 108 may be a solenoid-based air valve that includes a solenoid and a valve body. Upon activating the switch, the solenoid may be activated, which in turn causes the valve body to open, permitting compressed air to flow from the air delivery system 104 to the head unit 102. In other embodiments, the air valve 108 may be a mechanical air valve. Mechanical depression of the switch may mechanically open the valve body to allow the compressed air to flow. In some embodiments, the switch may include a foot pedal, such that when depressed an air gap is mechanically opened to allow the air to flow. In other embodiments, the switch may cause the disengagement (or engagement) of a mechanism that re-engages (or re-disengages) upon completing a mechanical cycle (which effectively acts as a timer mechanism). In some embodiments, the air pressure causes the mechanical cycle to occur. In other embodiments, a different mechanism such as a spring to cause the mechanical cycle to occur.

The air supply system 112 may source the air delivered to the head unit 102. The air supply system 112 may include an air compressor, a storage tank and one or more supply lines. The air compressor may be adapted to generate compressed/pressurized air, which is stored in the storage tank. The one or more supply lines carry the compressed air from the storage tank to the head unit 102. In some example embodiments, the air supply system 112 is part of the air delivery system 104. For instance, in some embodiments, the drying device 100 may be a portable device that includes a portable compressor and storage tank or that includes disposable or refillable canisters of compressed air. In some embodiments, the air supply system 112 is outside the air delivery system 104, and the air delivery system 104 delivers the air from the air supply system 112 to the head unit 102.

In some embodiments, the drying device 100 includes a power supply 110, which may be a DC power supply (e.g., one or more rechargeable or non-rechargeable batteries) or an AC power supply adapted to be plugged into a power outlet.

In some embodiments the drying device 100 is portable, and possibly portable in a carrying case with a handle. The carrying case may be large enough to also house a box of disposable gloves or other accessories.

In some embodiments, the head unit 102 is mountable on a tool rail of a dental delivery unit or other structure often located in a dental office. As known, the dental delivery unit may include a rolling cart that is easily re-located to different positions around a dental operatory. In some embodiments, the air delivery system 104 is housed within or otherwise provided on the dental delivery unit. The air delivery system 104 may be coupled to a fixed air supply system 112 located, for example, in the cabinetry or elsewhere in the dental office. Accordingly, the drying device 100 may be considered to be semi-portable as the head unit 102 and the air delivery system 104 may be moveable with the dental delivery unit albeit tethered to the air supply system 112. In some embodiments, the air supply system 112 is portable as well. For example, a storage tank and air compressor of the air supply system may be housed in or otherwise provided on the dental delivery unit.

In some example embodiments, the head unit 102, and optionally, one or more components of the air delivery system 104 may be attached to or included within a glove dispenser unit designed to house and dispense disposable gloves. Airflow can be initiated via a switch provided on a top, side, or bottom surface of the glove dispenser.

Figure 2A:
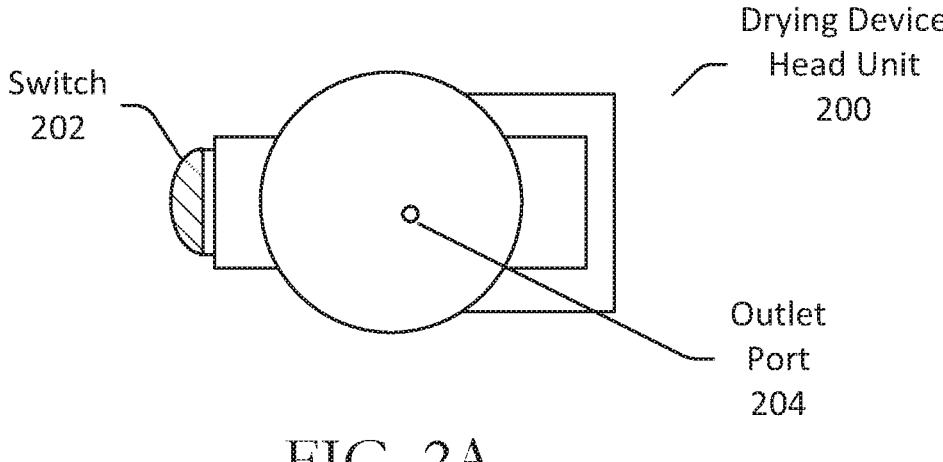
FIG. 2A is a top view of a head unit of a drying device, in accordance with some embodiments of the invention.

FIG. 2A is a top view of a head unit 200 of a drying device, in accordance with some embodiments of the invention. The head unit 200 may be a particular implementation of the head unit 102 of the drying device 100. As shown, the head unit 200 includes a switch 202 located in the front side of the head unit 200. The switch 202 may be a mechanical switch or an electrical switch. The switch 202 may be a momentary contact switch adapted to initiate airflow to the head unit 200 for a preset period of time responsive to activation (e.g., momentary depression of a button). The user may use the back of his or her hand to depress the switch 202, so as to avoid contaminating a user's clean hands. In still other example embodiments, the switch 202 may be a motion-activated switch that does not require physical contact to be activated. For instance, the switch 202 may be activated responsive to sensed motion.

Pressurized air may be ejected from the head unit 200 through an outlet port 204 provided in, for example, a top surface of the head unit 200.

Figure 2B:
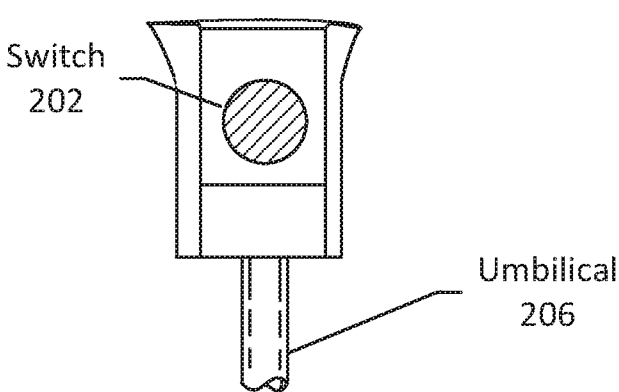
FIG. 2B is a front view of the head unit of FIG. 2A, in accordance with some embodiments of the invention.

FIG. 2B is a front view of the head unit 200, in accordance with some embodiments of the invention. As shown in FIGS. 2B-2E, an umbilical 206 may be provided which extends to the air delivery system 104. As shown in FIG. 2D, which is a cross-sectional view of the head unit 200 taken through cross-section A-A in FIG. 2C, the umbilical 206 may house an air hose 212 and switch wires 214. The air hose 212 may couple the air valve 108 of the air delivery system 104 to a supply port 208 (FIG. 2C) of the head unit 200. The switch wires 214 may electrically connect the air valve 106 (e.g., a solenoid air valve) to the switch 202.

Figure 2C:
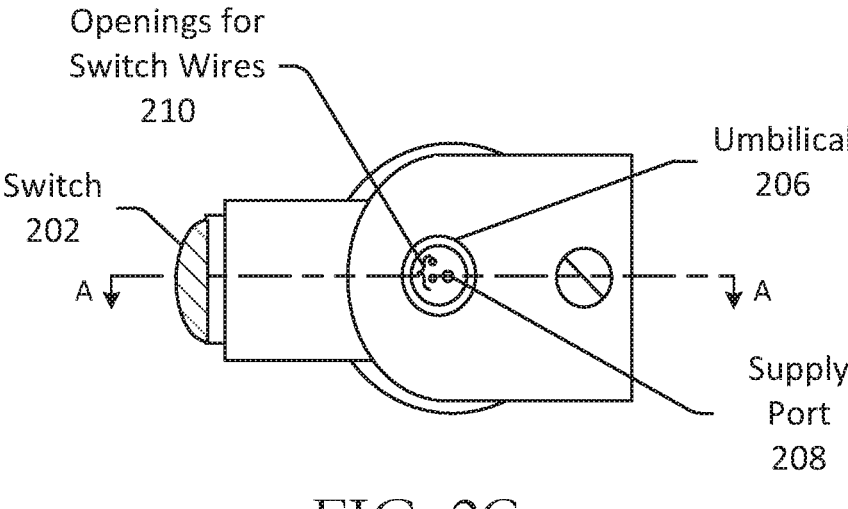
FIG. 2C is a bottom view of the head unit of FIG. 2A, in accordance with some embodiments of the invention.
Figure 2D:
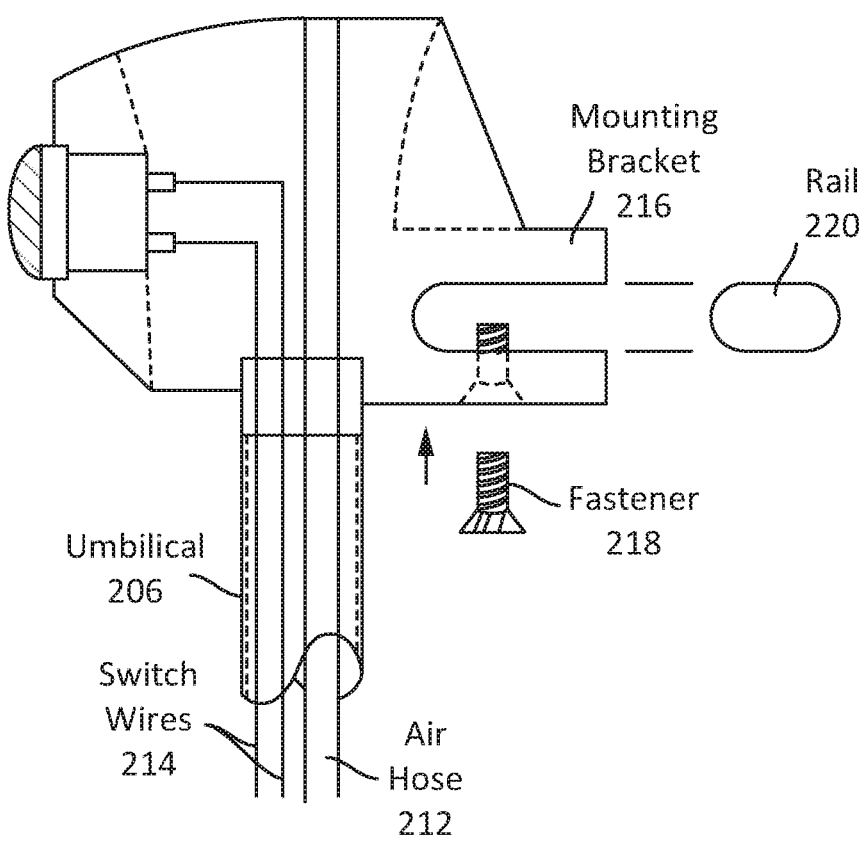
FIG. 2D is a cross-sectional side view of the head unit of FIG. 2A, where the cross-section is taken along a longitudinal axis of the head unit, in accordance with some embodiments of the invention.

FIG. 2C illustrates a bottom view of the head unit, in accordance with some embodiments of the invention. As shown, one or more openings 210 may be provided in the head unit 200 for receiving the air hose 212 and the switch wires 214. The switch wires 214 may be connected to electrical contacts of the switch 202 in the head unit 200. It should be appreciated that the switch wires 214 may not be present in mechanical embodiments, e.g., in which the switch 202 is a mechanical switch and the air valve 108 is a mechanical air valve.

As shown in FIG. 2D, the drying device 100 may include a mounting bracket 216 configured to attach to a tool rail 220. In some embodiments, the mounting bracket 216 may include one or more holes for receiving one or more fasteners 218 (e.g., screws, clamps, clips, etc.) for coupling the mounting bracket 216 and thus the head unit 200 to a tool rail 220. As indicated above, the tool rail 220 may be a part of a dental delivery unit. The tool rail 220 may be adapted to mount various other dental/medical tools as well. In some embodiments, the mounting bracket 216 is integrally formed as part of the head unit 200.

Figures 2E, 2F:
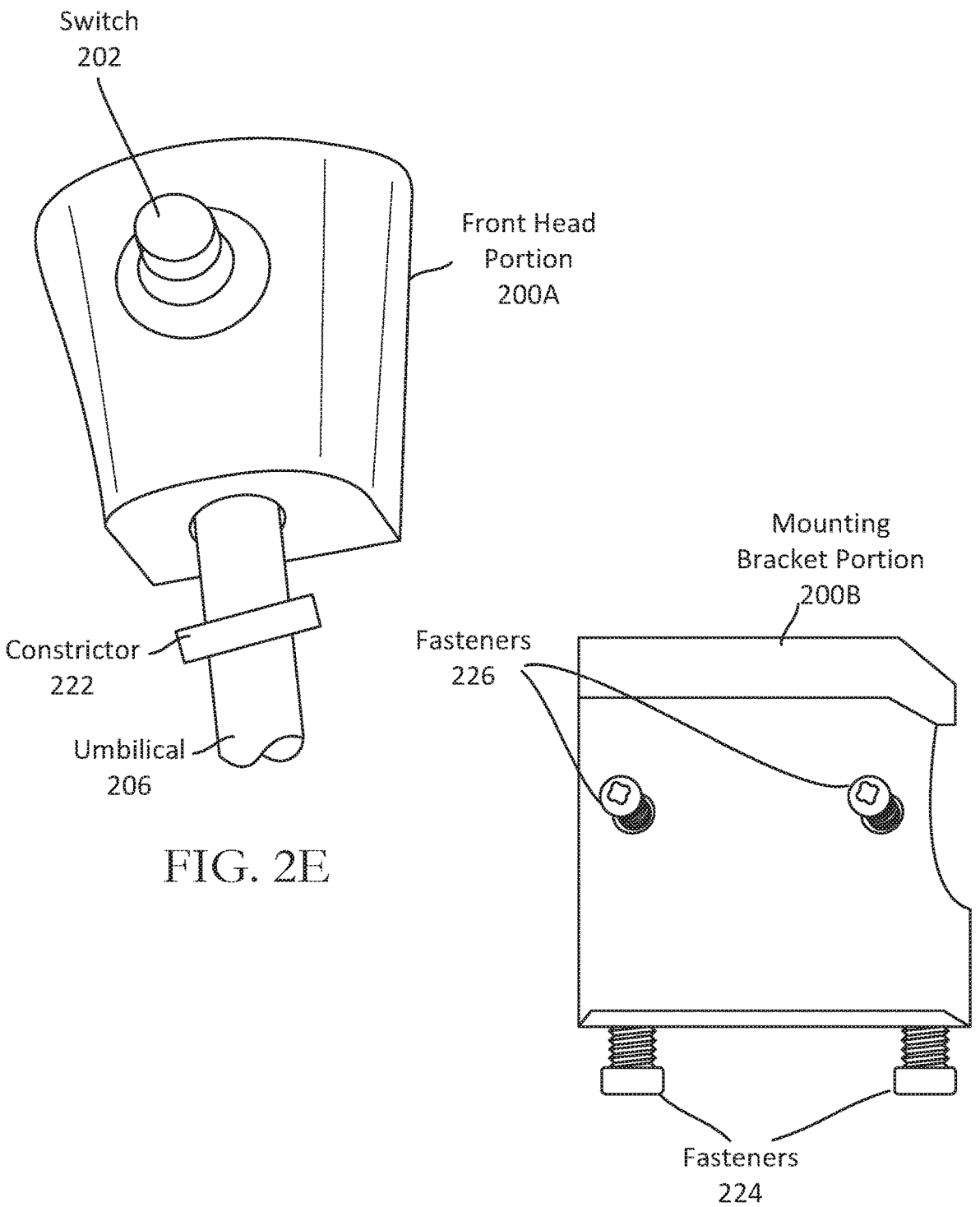
FIG. 2E is a perspective view of a front head unit portion of the head unit of FIG. 2A, in accordance with some embodiments of the invention.
FIG. 2F is a perspective view of a mounting bracket of the head unit of FIG. 2A, in accordance with some embodiments of the invention.

FIGS. 2E and 2F depict perspective views of a front head portion 200A of the head unit 200 and a mounting bracket portion 200B. As shown, the front head portion 200A and the mounting bracket portion 200B have been separately formed, in accordance with some embodiments of the invention. As shown, the mounting bracket portion 200B may be configured to mount to the tool rail 220 (FIG. 2D), using one or more fasteners 224 adapted to couple via holes in the mounting bracket portion 200B to the tool rail 220. The mounting bracket portion 200B may further include fasteners 226 that can be used to mount the front head portion 200A of the head unit 200 to the mounting bracket portion 200B. In some embodiments, openings and/or channels formed in a rear portion 200B of the front head portion 200A of the head unit 200 may be adapted to receive the ends of the fasteners 226 (e.g., screw heads) that protrude from the mounting bracket portion 200B such that the front head portion 200A of the head unit 200 is supported by the fasteners 226. In some embodiments, the fasteners 226 may be inserted into screw holes in the mounting bracket portion 200B and tightened to establish a tighter attachment to the front head portion 200A of the head unit 200 when installed.

As shown in FIG. 2E, a constrictor 222 may be attached to the umbilical 206. The constrictor 222 may be adjusted to effectively pinch the air hose contained within the umbilical 206, thereby effectively increasing or decreasing the diameter of the air hose and changing the amount of airflow transferring to the supply port 208 of the head unit 200. The constrictor 222 may include any suitable mechanically adjustable tube constricting mechanism. In some embodiments, the constrictor 222 may be affixed directly to the air hose contained within the umbilical 206, or may be positioned exterior to the umbilical 206 but adjusted to only pinch the air hose within the umbilical 206 without pinching the umbilical 206.

Figure 2G:
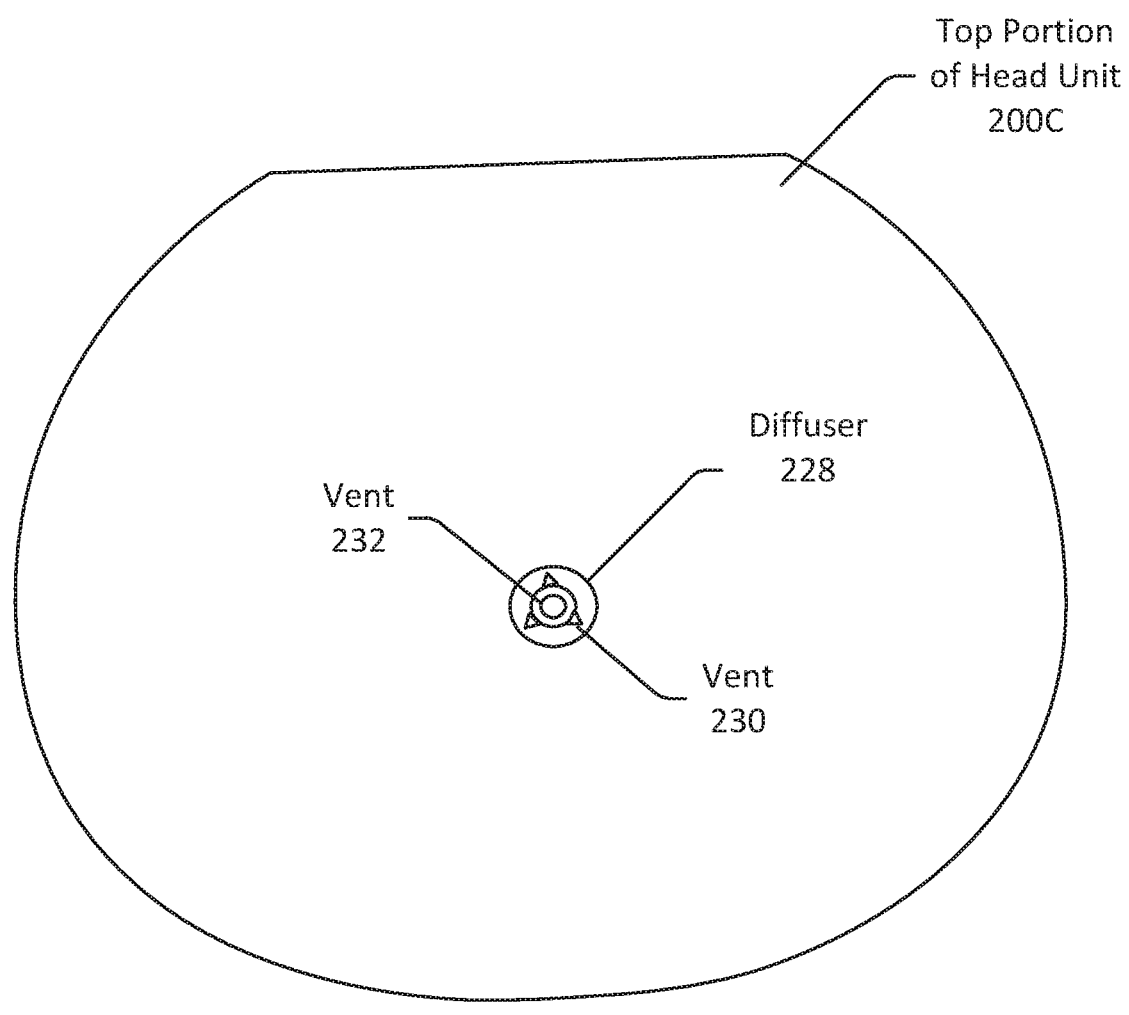
FIG. 2G is a top view of a diffuser coupled to the air outlet port on a head unit of a drying device, in accordance with some embodiments of the invention.

Referring again to FIG. 2A, the outlet port 204 of the head unit 200 may include a variety of different shapes and configurations to adjust airflow characteristics of air ejected from the outlet port 204. FIG. 2G illustrates an example embodiment in which a diffuser 228 is coupled to the outlet port 204 provided, for example, on a top portion 200C of the head unit 200. As shown, the diffuser 228 may include one or more vents adapted to direct airflow in different directions. The vents may be formed of different shapes/configurations such as circular vents, triangular vents, diamond-shaped vents, dome-shaped vents, square vents and/or any other suitable shape/configuration. In some example embodiments, a vent 232 may be centrally located over the outlet port 204, and one or more other vents 230 (having the same shape as the vent 232 or one or more different shapes) may be provided circumferentially around the vent 232. Other diffuser shapes may be possible.

Figure 3:
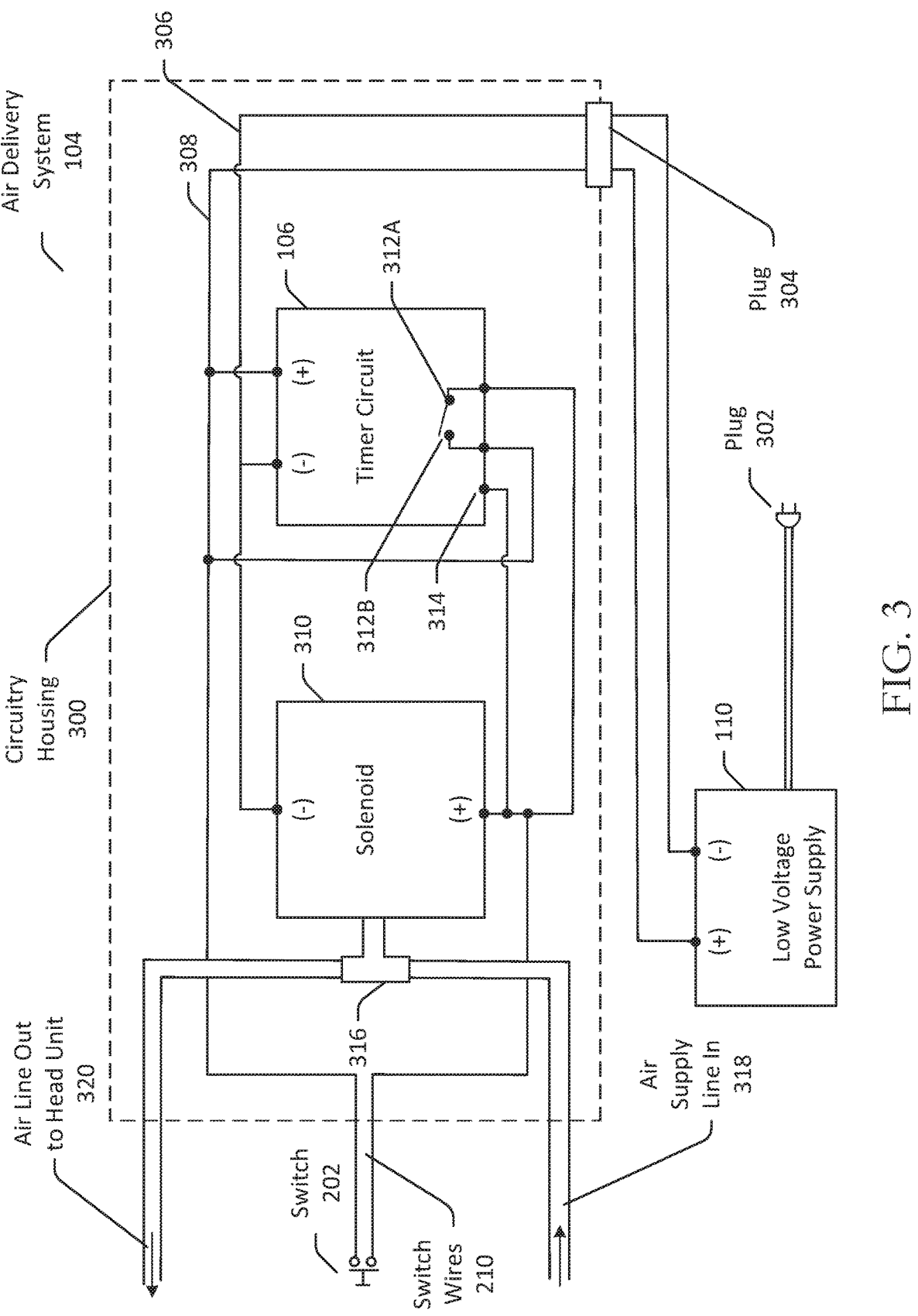
FIG. 3 illustrates details of an air delivery system of a drying device that includes an electronic switch for initiating air supply to a head unit of the drying device, in accordance with some embodiments of the invention.

FIG. 3 illustrates an example electrical implementation of the air delivery system 104 in which the switch 202 for initiating airflow to the head unit 102 includes an electronic switch, the timer device 106 includes a timer circuit, and the air valve 108 is a solenoid-based air valve. In some embodiments, the air valve 108 may include at least a solenoid 310 and a valve body 316. In some embodiments, the timer circuit 106 and the air valve 108 may be contained within circuitry housing 300. In some embodiments, the air delivery system 104 and the head unit 102 may be contained in a same housing. In some embodiments, the air delivery system 104 may be contained in a different housing than the head unit 102. In some embodiments, some components of the head unit 102 and some components of the air delivery system 104 may be contained in a same housing. For example, a portion of the switch 202 may be contained in the circuitry housing 300.

The power supply 110 may include an AC power supply (e.g., a power adapter) that includes a first plug 302 that connects to an electrical socket such as a 110V AC power outlet. The power supply 110 may be configured to receive electrical current via the power outlet. In some embodiments, the power supply 110 may control the voltage and/or current supplied to the electrical circuitry. The power supply 110 may include a second plug 304 configured to connect to a plug receptacle in the circuitry housing 200. Electrical leads 306, 308 may provide negative and positive sides of the AC power.

In some example embodiments, such as those in which the drying device 100 is portable, the power supply 110 may include a self-contained power source such as a battery, instead of or in addition to the AC power shown.

In some embodiments, when powered, the timer circuit 106 remains on standby. When the switch 202 is activated, the timer circuit 106 closes relay switch across contacts 310A, 312B for a short duration, which causes the solenoid 310 to activate during that time. As a result, the solenoid 310 opens the valve body 316, allowing compressed air to pass from the air supply system 112 via an air supply line in 318 to the head unit 102 via an air line out 320. While the timer circuit 106 maintains the relay switch closed, air continues to flow. Upon expiration of the timer, the relay switch opens and the air solenoid valve 106 deactivates and causes valve body 316 to close, which stops the flow of air. In some embodiments, the timer circuit 106 may be programmed with a user-configured time delay value. Notably, the circuits herein may operate as active open or active closed.

Figure 4:
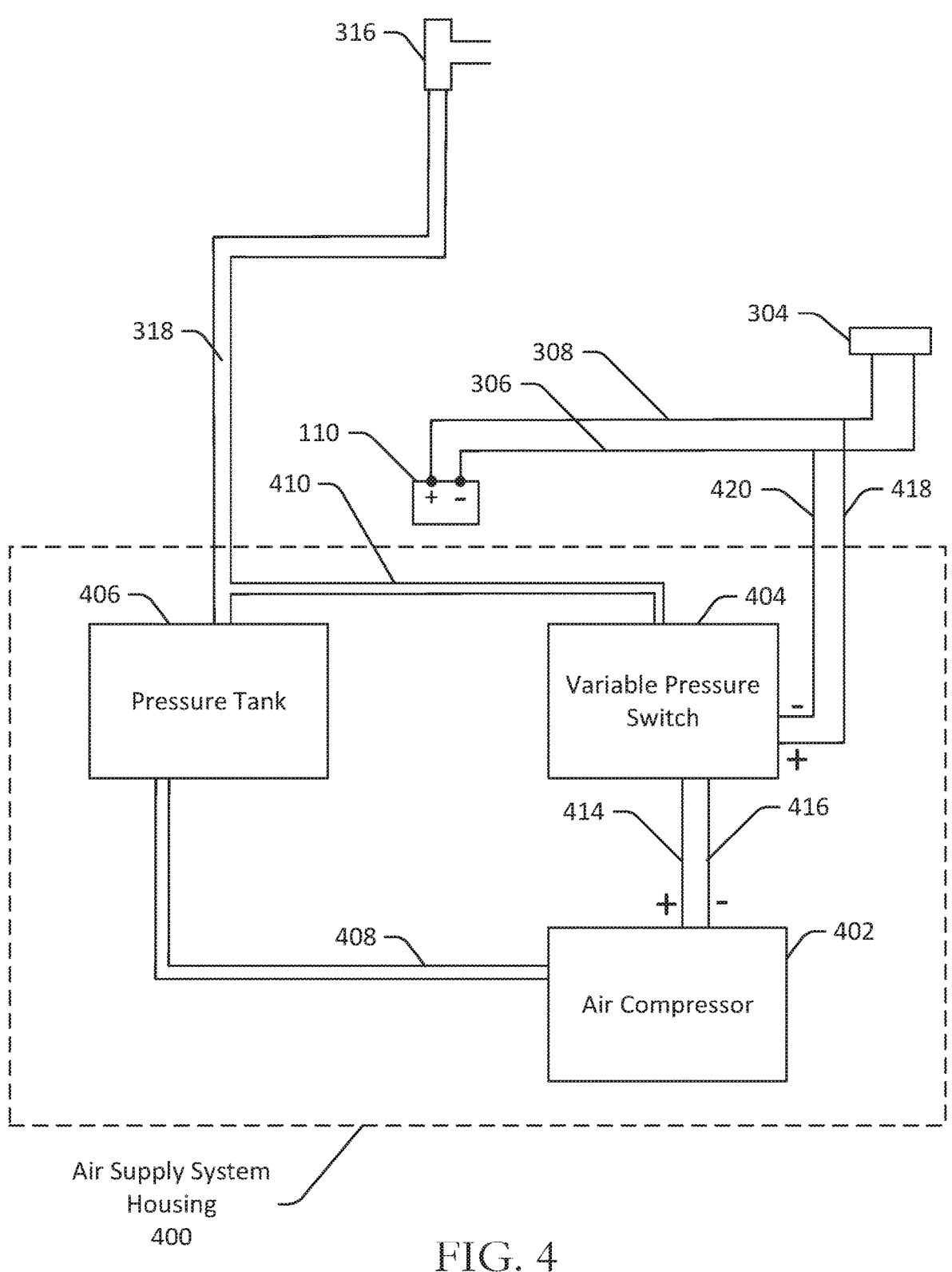
FIG. 4 illustrates details of an air supply system for supplying air to an air delivery system of a drying device, in accordance with some embodiments of the invention.

FIG. 4 illustrates an example implementation of the air supply system 112, in accordance with some embodiments of the invention. In some embodiments, the air supply system 112 may include an air compressor 402, a compressed air storage tank 406, and a variable pressure switch 404. In some embodiments, the air compressor 402, the compressed air storage tank 406, and the variable pressure switch 404 are contained in an air supply system housing 400. The air compressor 402 may be configured to generate compressed air, which is fed via supply line 408 to the pressure tank 406 for storage. The variable pressure switch 404 may be configured to monitor the pressure of the compressed air via line 410 at or near an outlet of the pressure tank 406, e.g., in air supply line 318. In some embodiments, the variable pressure switch 404 may be configured to monitor pressure of the compressed air within the tank 406 itself.

The variable pressure switch 404 may be electrically coupled to power the air compressor 402. In some embodiments, the variable pressure switch 404 may be configured to receive power from the power supply 110 via electrical leads 420 and 418. When the variable pressure switch 404 detects that the air pressure in the tank 406 or the air pressure exiting the tank 406 has fallen below a minimum threshold pressure, the variable pressure switch 404 may be configured to activate the air compressor 402 to load the pressure tank 406.

In some embodiments, the air supply system 112 may be portable. In some embodiments, the air supply system 112 may be part of the air delivery system 104 and contained within the same housing. In some embodiments, the head unit 102, the air delivery system 104, and the air supply system 112 may all be contained within a portable housing. In some embodiments, the air supply system 112 may be a pre-existing stand-alone system (as often exists in a dental clinic), the air delivery system 104 may couple to the pre-existing stand-alone air supply system 112, and the air delivery system 104 and the head unit 102 may be contained in a single housing or separate housings. In some embodiments, the air delivery system 104 (or at least components thereof) may be contained in a separate housing from the head unit 102.

Figure 5A:
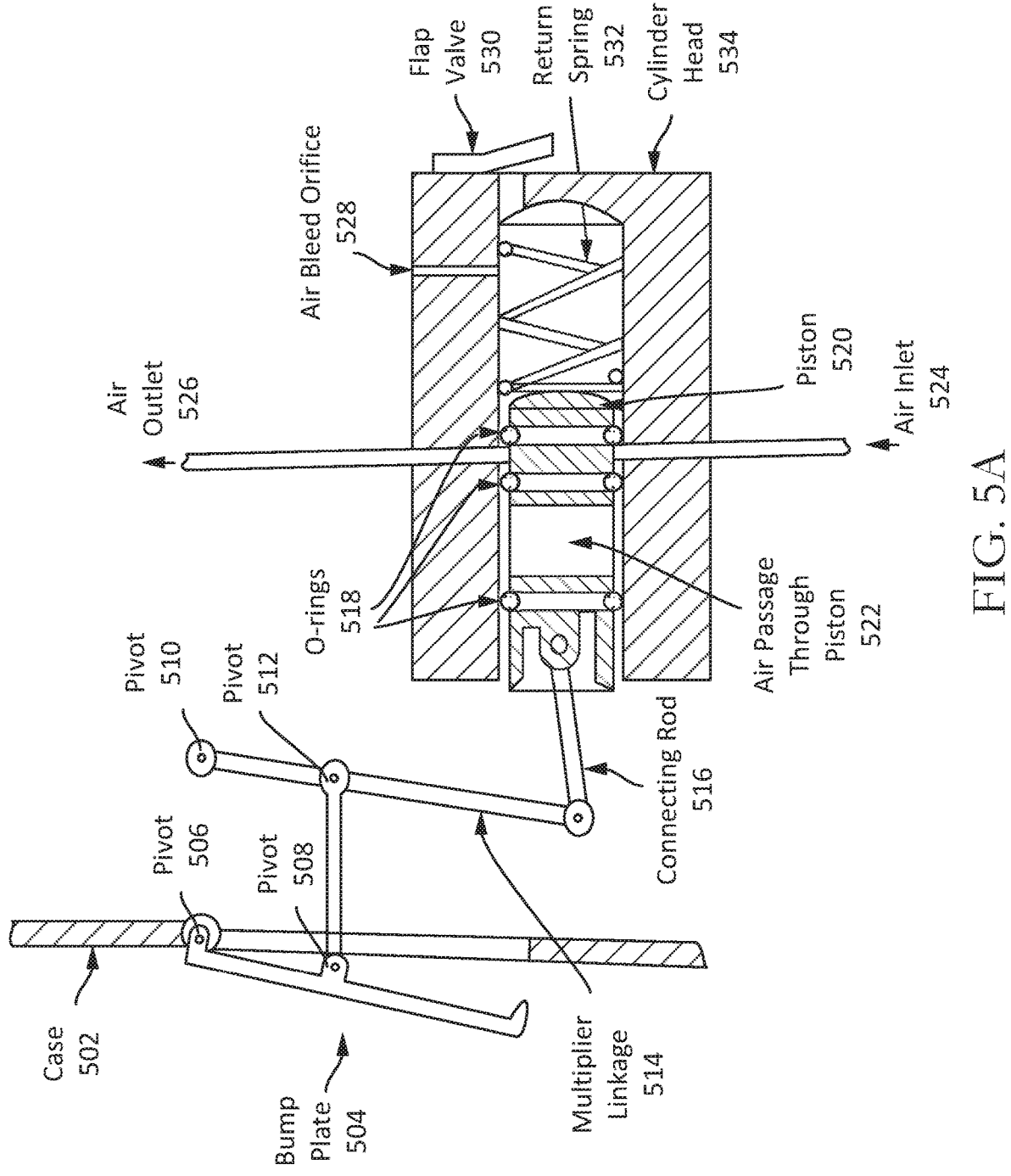
FIG. 5A illustrates details of a mechanical switch for initiating air supply to a head unit of a drying device, in accordance with some embodiments of the invention.

FIG. 5A illustrates a mechanical air valve that acts as a mechanical switch for initiating air supply to a head unit 102, in accordance with some embodiments of the invention. The mechanical air valve may be a particular implementation of the air valve 106. The mechanical air valve may include a casing 502. In some embodiments, the casing 502 may be a housing of the head unit 102. In some embodiments, the mechanical air valve may be housed separately from the head unit 102. In some embodiments, one or more components of the mechanical air valve may be contained in the same housing as the head unit 102, while one or more other components of the mechanical air valve may be separate from the head unit 102.

The mechanical air valve may include a bump plate 504 adapted to be depressed by an operator. In some example embodiments, the bump plate 504 may be a foot pedal. In some embodiments, the bump plate 504 may be provided on an exterior surface of the head unit 102. Depressing the bump plate 502 causes the bump plate 502 to rotate about pivot 506. The applied force transfers via pivot 508 and multiplier linkage 514 to a piston 520, which includes pivots 510 and 512 and connecting rod 516. The applied force causes the piston 520 to extend into a cylinder head 534, compressing a return spring 532. One or more O-rings 518 or other types of seals may be applied to one or more portions of the housing of the piston 520.

The mechanical switch may include a flap valve 530 that exhausts air from inside the cylinder head 534 as the piston extends into the cylinder head 534. The flap valve 530 may close when the piston 520 ceases to move, which corresponds to the most compressed state achieved by the spring 532. In some embodiments, the flap valve 530 may include a spring having a relatively weak spring force positioned outside the cylinder housing to hold the flap valve 530 tightly against the housing of the cylinder head 534.

An air bleed orifice 528 may be provided in the housing of the cylinder head 534 to allow restricted airflow to enter the cylinder head 534. This restricted airflow may resist the spring 532 as it pushes the piston 520 back out of the cylinder head 534 and biases it to return to its uncompressed (or less compressed) original state. As illustrated in more detail in FIG. 6, the piston 520 includes an air passage 522 that penetrates through an interior portion of the piston 520. When the spring 532 is in the compressed state, the air passage 522 aligns with an air inlet 524 into the mechanical switch and an air outlet 526 out of the switch, thereby allowing unrestricted air (e.g., compressed air) to pass through the air passage 522 from, for example, the air supply system 112 to the head unit 102.

During some or all of the period of time required for the spring 532 to return to its original state, the air passage 522 may remain at least partially aligned with the air inlet 524 and the air outlet 526, thereby permitting air to pass. When the spring 532 returns to its original state or at some point prior to that, the air passage 522 is no longer aligned with the air inlet 524 and air outlet 526, at which time airflow through the piston 520 ceases to pass. The period of time between the compressed state achieved by the spring 532 and the reduced (or non-compressed) state when airflow through the piston 520 ceases may be a repeatable time delay associated with the mechanical air valve. As such, the mechanical air valve may operate as a mechanical timer switch.

In some embodiments, the period of time required for the spring 532 to return to its original state from its fully compressed state may be correlated to the size of the orifice 534, the size of the spring 532, the size of the air passage 522 and/or the like. In some embodiments, the size of the orifice 534 may be proportional to the repeatable time delay associated with the spring 532 decompressing, with a smaller orifice 534 resulting in a longer time delay. In some example embodiments, the size of the orifice 528 may be adjustable. Adjusting the size of the orifice 528 may change the amount of restricted airflow that is permitted to enter the cylinder head 534, which in turn, changes the duration of the repeatable time delay. Thus, in some embodiments, the size of the orifice 534 may be adjusted to adjust the duration of the mechanical timer of the mechanical air valve.

Figure 6:
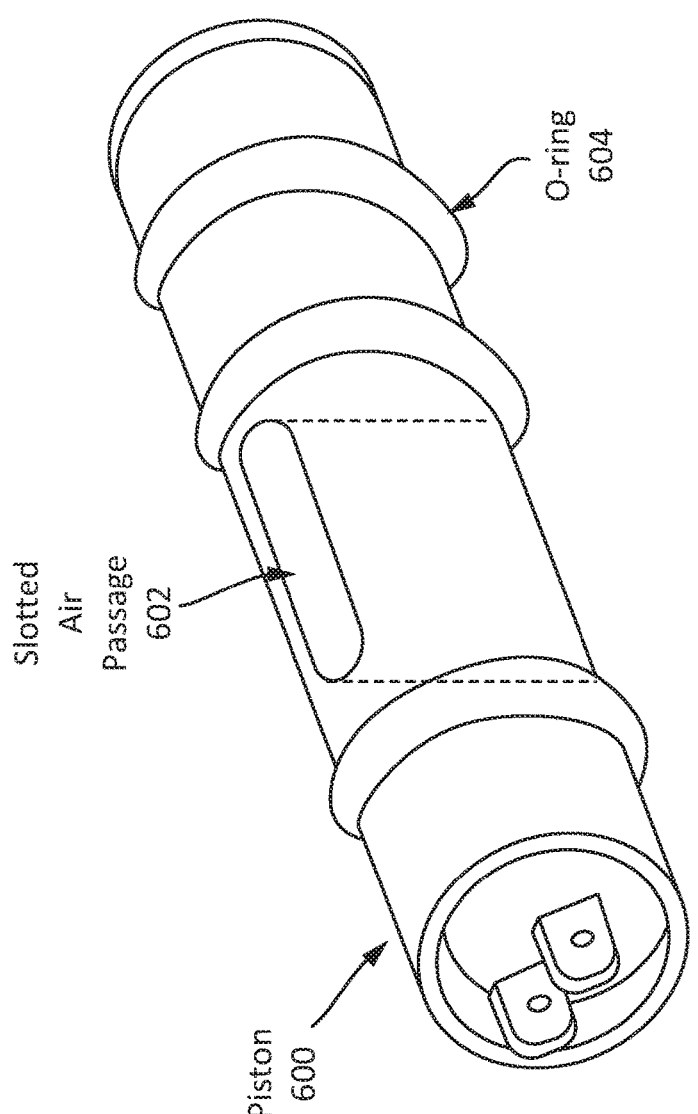
FIG. 6 illustrates a detailed view of a piston that forms part of the mechanical switch illustrated in FIG. 5A, in accordance with some embodiments of the invention.

FIG. 6 illustrates a more detailed view of the piston 520 that forms part of the mechanical air valve illustrated in FIG. 5A. Piston 600 may represent a particular implementation of the piston 520. The piston 600 may include a slotted air passage 602 formed through an interior portion of the body of the piston 600. While the slotted air passage 602 is illustrated as an elongated opening with rounded corners formed in the piston body 600, it should be appreciated that the passage 602 may have any suitable shape or configuration. In some embodiments, the slotted air passage 602 may extend through the entire piston body 600, thereby enabling unrestricted airflow from one side of the piston body 600 through an interior of the piston body 600 to an opposing side. The piston 600 may further include one or more O-rings 604 or other types of seals that join portions of the piston body 600 and that reduce or eliminate air leaks at the junctures where the portions are joined.

It should be appreciated that variations in the particular structure of the mechanical air valve illustrated in FIG. 5A and the piston 600 illustrated in FIG. 6 are within the scope of the invention. For example, in some embodiments, the multiplier linkage 514 may be modified to reduce the number of linkages or otherwise simplify the mechanism. Further, in some embodiments, activation switches/mechanisms other than the bump plate 504 may be used.

Figure 5B:
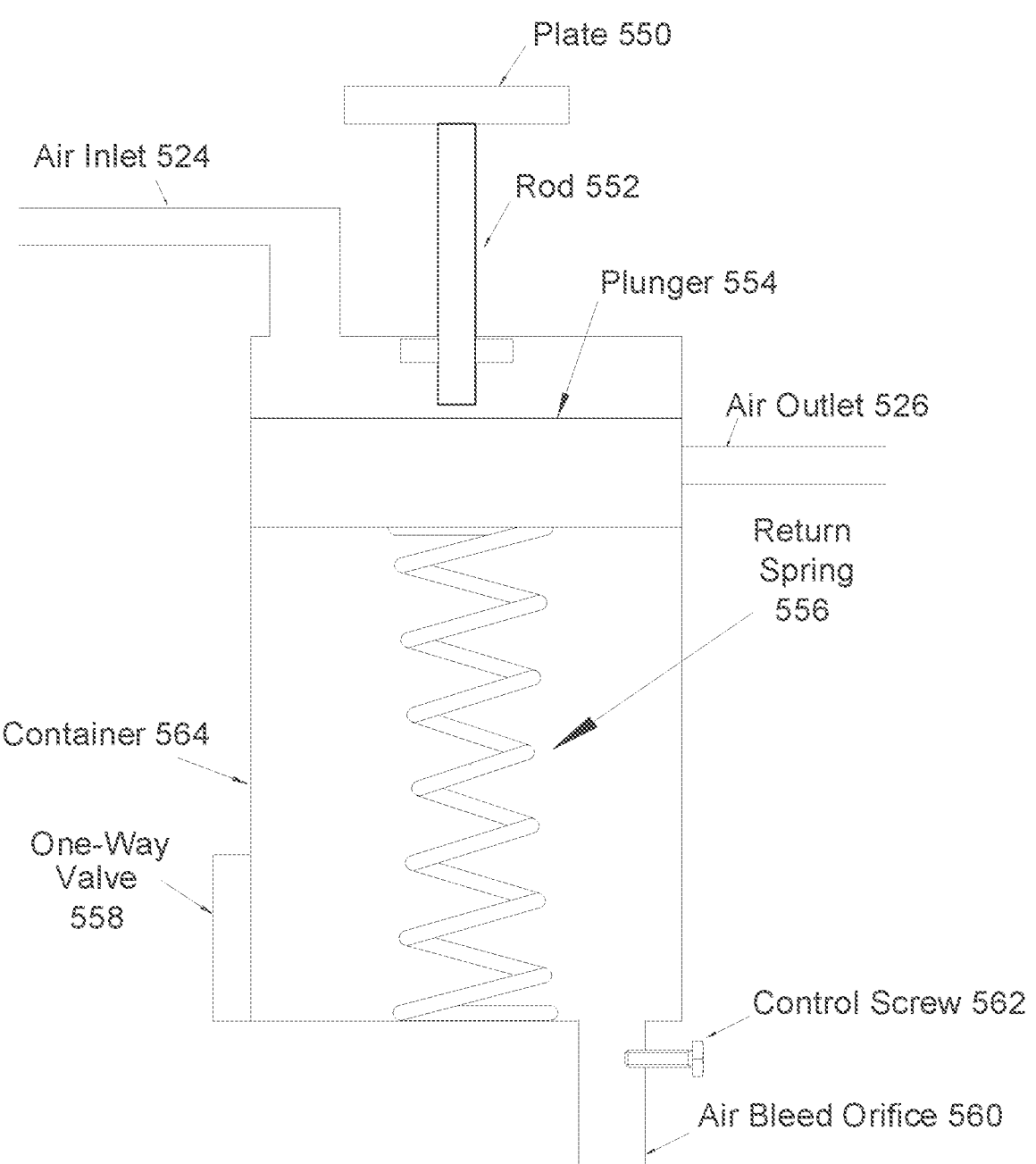
FIG. 5B illustrates another mechanical air valve that acts as a mechanical switch for initiating air supply to a head unit, in accordance with some embodiments of the invention.

FIG. 5B illustrates another mechanical air valve that acts as a mechanical switch for initiating air supply to a head unit 102, in accordance with some embodiments of the invention. The mechanical air valve may be a particular implementation of the air valve 106. As shown, the mechanical air valve includes a plate 550 that, when depressed, pushes rod 552. Rod 552 presses plunger 554 downward, countering return spring 556. Air in the lower portion of container 564 is forced out 1-way valve 558. The upper portion of container 564 allows air to flow between air inlet 524 and air outlet 526 until the plunger returns to its upper position, as biased by return spring 556. The time it takes return spring 556 to return to its upper position may be based on the rate of air flow returning from air bleed orifice 560 into the lower portion of the container 564. The dimension of air bleed orifice 560 may be controlled by a control screw 562 that effectively pinches air bleed orifice 560 to increase or decrease the active time period. Alternatively or additionally, the length of rod 552 may be controlled to increase or decrease the distance plunger 554 moves into the lower portion of the container 564, thereby increasing or decreasing the active time period. Notably, a control screw 562 like that shown in FIG. 5B can be used in the embodiment shown in FIG. 5A.

Figure 7:
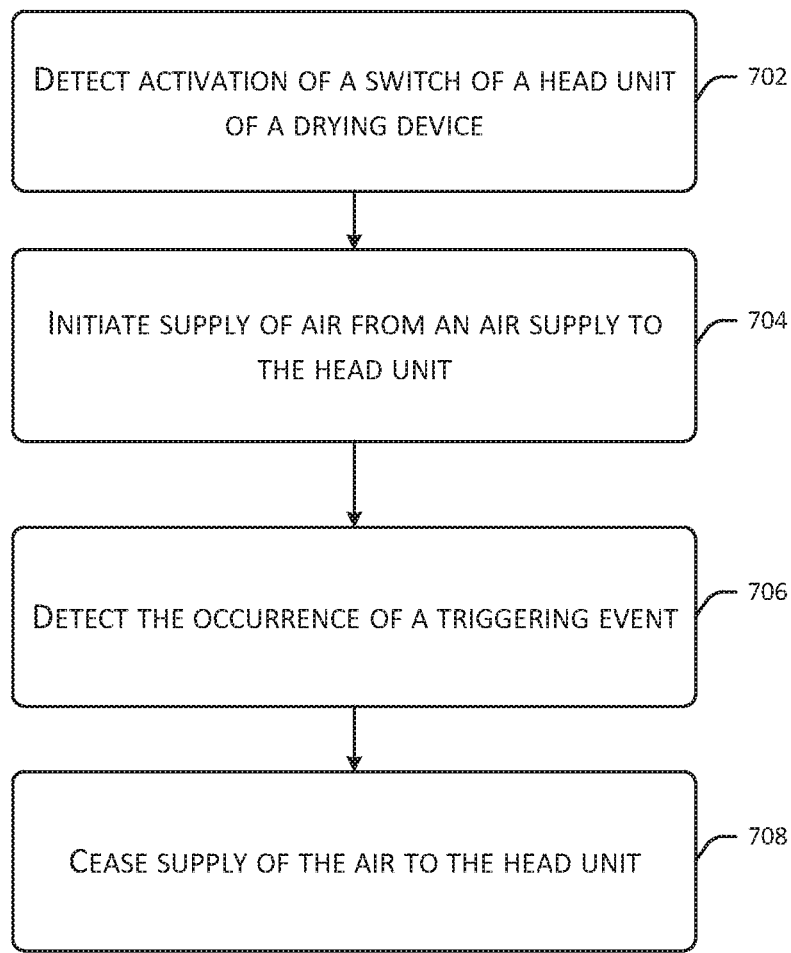
FIG. 7 depicts a flowchart of a method of using a drying device, in accordance with some embodiments of the invention.

FIG. 7 depicts a flowchart of an illustrative method 700 of using a drying device, in accordance with some embodiments of the invention. At block 702, activation of a switch (e.g., switch 202) of a head unit (e.g., head unit 200) of a drying device 100 is detected. The switch may be a mechanical switch (e.g., a mechanical air valve) or an electrical switch (e.g., an air solenoid valve). The switch may be a momentary contact switch, a foot-activated switch (e.g., which may be a momentary contact switch), a motion sensor switch, or the like.

At block 704, a supply of air is initiated from an air supply to the head unit 102. The air may be supplied from an air supply system 112, which may be part of the drying device 100 that includes the head unit 102, or a stand-alone system. The air may be supplied to the head unit 102 from the air supply system 112 via the air delivery system 104.

At block 706, the occurrence of a triggering event is detected. In the case of a mechanical activation switch, the triggering event may occur at the expiration of the repeatable time delay associated with operation of a return spring 532 in a mechanical air valve illustrated in FIG. 5A or 5B. In the case of an electrical switch, the triggering event may be the expiration of a time delay programmed into a digital timer circuit.

At block 708, in response to occurrence of the triggering event, the supply of air to the head unit 102 may cease. For example, the expiration of the programmed time delay of the timer circuit 106 may cause the relay switch between contacts 312A, 312B to open, thereby causing the solenoid 310 to close the valve body 316. Alternatively, the supply of air may cease when no portion of the air passage 522 formed in the piston 520 of the mechanical valve air illustrated in FIG. 5A is aligned with the air inlet 524 and the air outlet 526 or when plunger 554 returns to the upper portion of the container 564 illustrated in FIG. 5B.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The present invention(s) are described above with reference to example embodiments. It will be apparent to those skilled in the art that various modifications may be made and other embodiments may be used without departing from the broader scope of the present invention(s). Therefore, these and other variations upon the example embodiments are intended to be covered by the present invention(s).

The invention claimed is:

1. A hand drying device, comprising:
   a head unit including an outlet port adapted to eject only airflow into an environment in a direction accessible to hands of a user, the outlet port adapted to be stationary and touchless during use;

an activation switch configured to receive a user activation to initiate ejection of the airflow;

a supply port coupled to the outlet port and adapted to receive the airflow; and a mounting bracket adapted to mount the head unit to a tool bar of a dental delivery unit;

an air delivery system including an air valve configured to be coupled to an air tank, the air tank configured to supply the airflow, the air valve adapted to open to allow the airflow from the air tank to pass to the supply port of the head unit in response to an activation event; and a device or circuitry configured to receive the user activation, to effect the activation event to open the air valve in response to the user activation to cause the airflow to pass continuously to the supply port while activated and configured to effect a deactivation event to close the air valve to stop the airflow while deactivated; and an air tube that couples the air valve to the supply port.

2. The hand drying device of claim 1, wherein the activation switch is a momentary contact switch.

3. The hand drying device of claim 1, wherein the activation switch is a foot-activated switch.

4. The hand drying device of claim 1, wherein the activation switch is a motion-activated switch.

5. The hand drying device of claim 1, wherein the air valve includes an air solenoid valve.

6. The hand drying device of claim 5, wherein the device or circuitry is a timer device that includes a programmable timer circuit.

7. The hand drying device of claim 1, wherein the air delivery system and the head unit are contained in separate housings.

8. The hand drying device of claim 1, further comprising an air supply system including the air tank and an air compressor coupled to the air tank, the air compressor configured to pressurize air for storage in the air tank.

9. The hand drying device of claim 1, further comprising a constrictor coupled to the air tube, the constrictor adapted to adjust a pressure of the airflow to the supply port.

10. The hand drying device of claim 1, further comprising a diffuser coupled to the outlet port, the diffuser adapted to diffuse the airflow into the environment.

11. The hand drying device of claim 1, wherein the air tank is a stand-alone air tank located in a dental office.

12. The hand drying device of claim 1, wherein the air tank is coupled to a stand-alone air compressor located in a dental office.

13. The hand drying device of claim 1, wherein the hand drying device is a portable unit.

14. The hand drying device of claim 1, wherein the air valve is a mechanical air valve, and wherein the device or circuitry is a timer device including a spring mechanism for controlling the mechanical air valve.

15. The hand drying device of claim 14, wherein the mechanical air valve includes a piston, and wherein activation of the activation switch causes the piston to compress the spring mechanism.

16. The hand drying device of claim 14, wherein the timer device includes an orifice formed in a cylinder body housing the spring mechanism, a size of the orifice determining an amount of restricted airflow acting against a spring force of the spring mechanism.

17. The hand drying device of claim 16, the size of the orifice being proportional to a repeatable time delay corresponding to a duration of time required for the spring mechanism to transition from a most compressed state achieved after activation of the activation switch to a state in which an air passage formed in the piston is no longer aligned with an air inlet and an air outlet of the mechanical air valve.

* * * * *